(12) United States Patent
Bunney et al.

(10) Patent No.: US 6,446,112 B1
(45) Date of Patent: Sep. 3, 2002

(54) IRC NAME TRANSLATION PROTOCOL

(75) Inventors: William Bunney, Köln (DE); Steve Knox, Brier, WA (US)

(73) Assignee: Sony International (Europe) GmbH, Berlin (DE)

( * ) Notice: Subject to any disclaimer, the term of this patent is extended or adjusted under 35 U.S.C. 154(b) by 0 days.

(21) Appl. No.: 09/270,602

(22) Filed: Mar. 17, 1999

(30) Foreign Application Priority Data

Mar. 18, 1998  (EP) ............................................. 98104934

(51) Int. Cl.⁷ ............................................... G06F 13/00
(52) U.S. Cl. ...................................................... 709/204
(58) Field of Search ................................ 709/203, 204, 709/217, 219

(56) References Cited

U.S. PATENT DOCUMENTS 5,245,656 A * 9/1993 Loeb et al. .................... 380/23
5,307,494 A * 4/1994 Yasumatsu et al. ......... 395/600

OTHER PUBLICATIONS

Oikarinen, Reed," Internet Relay Chat Protocol" May 1993, pp. 1–66.*
"Ethioirc" Jan. 1996, pp. 1–5.*

J. Oikarinen & D. Reed: "Internet Relay Chat Protocol—RFC 1459" Network Working Group, May 1993, pp. 1–66, XP002076695.
Gall U et al: "Promondia: a Java–based framework for real–time group communicatin in the Web" Computer Networks and ISDN Systems, vol. 29, No. 8–13, Sep. 1997, pp. 917–926 XP004095291.

* cited by examiner

*Primary Examiner*—Robert B. Harrell
(74) *Attorney, Agent, or Firm*—Frommer Lawrence & Haug LLP; William S. Frommer; Samuel H. Megerditchian

(57) ABSTRACT

A network comprising at least one server (1) and a plurality of user terminals (3), wherein the user terminals (3) can communicate with each other by means of an IRC server (40). The user terminal (3) can send a command to a chat proxy (39). The chat proxy (39) is connected with a session manager (23) to translate any address longer than nine characters (limit of the IRC protocol) to a code with a maximum length of nine characters. The chat proxy (39) can cache the result of the conversion in a storage device (42). The chat proxy (39) then sends (41) an IRC command to the IRC server (40) together with a code having a maximum number of nine characters. The chat proxy (39) according to the present invention therefore allows a translation process, the provision of semi-private chat rooms with an additional access control and a supply of supplemental chat room attributes.

11 Claims, 5 Drawing Sheets

| USER | ADDRESSES |
|---|---|
| George X. | ① George.compu.xxx.com<br>② Superman.sport.xxx.com<br>③ Max.game.xxx.com |
| Pete Y. | ① ...<br>② ...<br>③ ... |
| ... | ... |

Fig. 3

| group | preferences interests | members |
|---|---|---|
| compu | – computers<br>– networks | – George X.<br>– ...<br>– ... |
| sport | – activities<br>– results | – George X.<br>– ...<br>– ... |
| game | – computer games | – George X.<br>– ...<br>– ... |

Fig. 4

IRC NAME TRANSLATION PROTOCOL

BACKGROUND OF THE INVENTION

The present invention generally relates to the field of computer networks. A network is a distributed communication system of computers comprising user terminals and at least one server, the computers of which are interconnected by various electronic communication links and computer software protocols. A particularly well-known network is the internet. The internet is a world-wide network whose electronic resources include among others text files, graphic files in various formats, world-wide-web pages, etc. The scheme for denotation of an electronic resource on the internet is an electronic address which uniquely identifies its location within the network and within the computer in which it resides. On the internet such an electronic address is called URL (universal resource locator).

The present invention is particularly concerned with so-called IRC (internet relay chat) servers. The internet relay chat is an application providing for a communication of a plurality of user terminals. All over the world more than a hundred IRC-servers do exist, which are connected with each other and which can share information with each other. As IRC is a distributed system, the user is only communicating with the server closest to his terminal. IRC is subdivided in so-called channels. Each channel has its name representing usually the theme of the discussion. When communicating with the IRC protocol the users usually use nicknames. The nickname becomes visible for the other users as soon as another user is entering a channel. All messages communicated according to the IRC protocol are accompanied by the nicknames. However, according to the IRC protocol this nickname can have a maximum length of nine characters and has to be unique in one IRC session. Obviously, the limitation of the maximum length of a nickname according to the IRC protocol to nine characters is a disadvantage. With nine characters it usually is not very easy to constitute a nickname having a good mnemonic effect.

SUMMARY OF THE INVENTION

Therefore, the present invention has the object to enable the usage of nicknames with more than nine characters when communicating with an IRC server.

This object is achieved by means of the features of the independent claims.

According to the present invention therefore a communication method for a network comprising at least one server and a plurality of user terminals is provided. The user terminals thereby can communicate with each other by means of an IRC server. According to the present invention a command from a user terminal is sent to a converting means together with a sender address, which can have more than nine characters. The sender address is converted into a code with a maximum number of nine characters. Then an IRC command is sent to the IRC server together with a code having a maximum number of nine characters.

A converting means can contact a session manager to get the code with a maximum number of nine characters.

The session manager is connected to a session data base containing the addresses of the users logged in, which session data base is stored in an object-oriented approach on a server.

The converting means caches the conversion of a sender address once the session manager had been contacted for the conversion of a corresponding sender address.

By checking access information stored in an access-control data base, an access control for the access to the IRC server can be performed.

The information about the chat channel of the IRC server can be supplied by the converting means.

According to the present invention furthermore a communication network comprising at least one server and a plurality of user terminals is provided. The user terminals can communicate with each other by means of an IRC server. The network comprises a converting means for receiving a command from a user terminal together with a sender address, which sender address can have more than nine characters. The converting means 39 can convert the sender address into a code with a maximum number of nine characters. The converting means then sends an IRC command to the IRC server together with a code having a maximum number of nine characters.

A session manager can be connected to the converting means, wherein the converting means contacts the session manager to get the code with a maximum number of nine characters. The session manager can be connected to a session data base containing the addresses of the users logged in, which session data base is stored in an object-oriented approach on a server.

The converting means can comprise a storage means for caching the conversion of a sender address once the session manager had been contacted for the conversion of a sender address.

An access-control data base can be connected to the converting means to effect an access control for the access to the IRC server by checking access information stored in an access-control data base.

Further characteristics and advantages of the present invention will be explained with reference to embodiments of the present invention and the enclosed drawings.

BRIEF DESCRIPTION OF THE DRAWING

FIG. 3 shows a table installed in the server and containing assignment information of different addresses of one user, FIG. 4 shows an example of the information stored in a group data base.

DETAILED DESCRIPTION OF THE INVENTION

Figure 1:
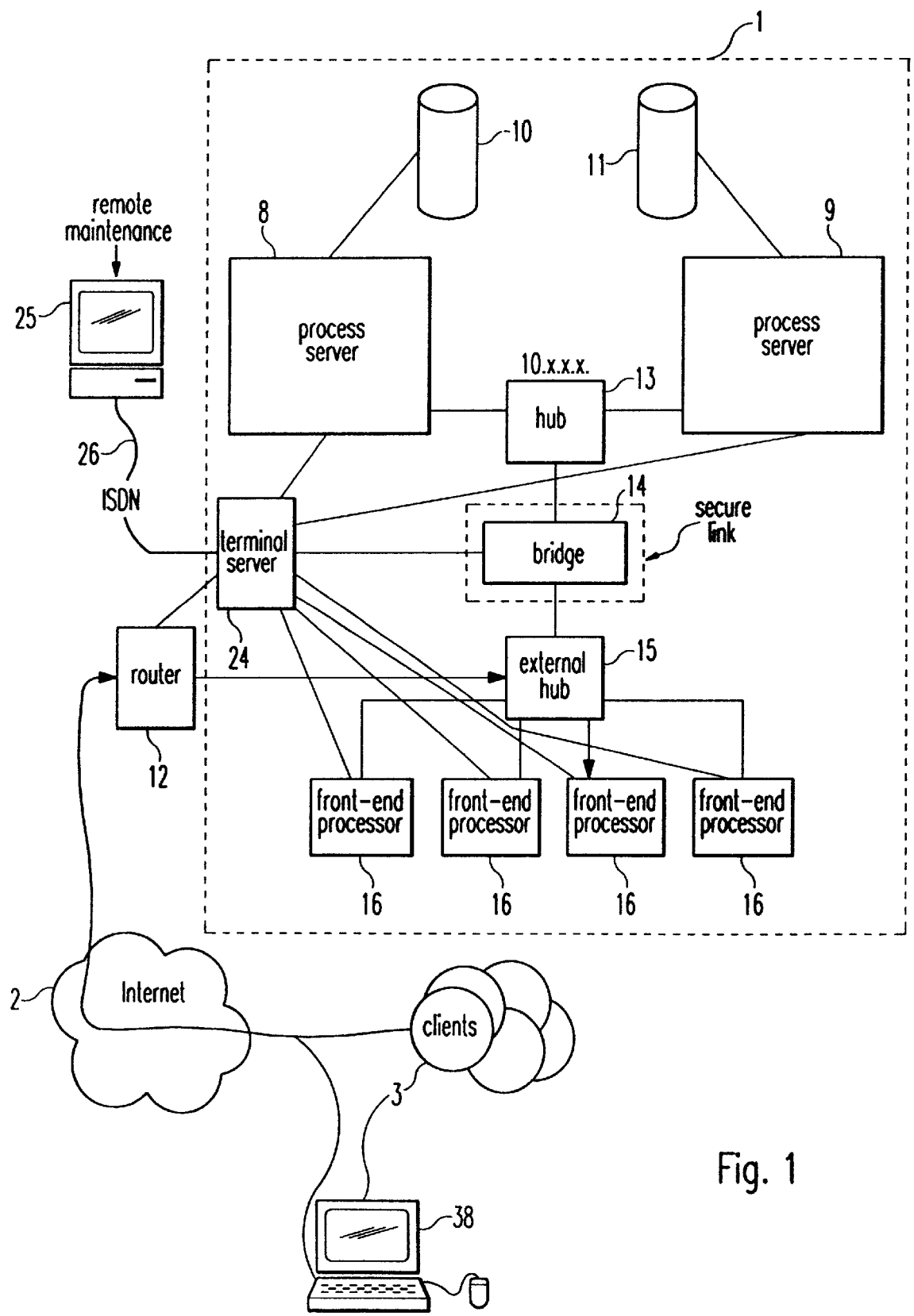
FIG. 1 shows an overview over a hardware structure which can be used for the application of the present invention.

The present invention relates to the technical field of networks particularly for an Internet application. Such a network generally should offer the following services:

actionable messaging between individuals, or for notification of events or special offers, with the control center prompting for user response;

web-based e-mail;

one-to-one and many-to-many chat groups;

discussion groups (Internet news groups)

public event scheduling;

online searching for people, events, and information, with results filtered based on member focus and preferences;

a free home page simple tools to create and modify web pages;

contact list management and facilities to make it easy to recruit friends and family, an address book and personal data base, common across a plurality of devices and services;

the opportunity to use a plurality of identities per person, along with associated preferences and interests for each identity;

community center;

simple tools to enable individual members to set up and manage chat rooms and discussion groups with friends or other like-minded people;

and innovative navigation.

Further services can comprise narrowly targeted advertising, electronic commerce, and cross-platform support for intelligent devices such as telephones, televisions, or personal digital assistants.

Members of the network can have profiles of information about them, not just names and addresses, but also their interests and preferences. Members will be able to enter and edit preferences if they wish, but they need not to fill out a form to derive this benefit. Member profiles can be built up over time as a process in the system watches what they access, sign up for, or otherwise evince interest in.

User profiles can be used to filter searches, so that the results of a keyword search can be ranked according to preferences suggested by the user profile.

According to the present invention, members are able to assume several identities: for example, a personal, professional, and one identity used for fantasy or play. Members can have a home page and a profile for each identity, and can maintain anonymity in any interaction, if they so choose. Therefore a plurality of home pages respectively for one identity of a user can be assigned to one user. This will be explained in detail further below.

Users can create their home pages by answering a series of questions, and various templates can be available to make it easy for members to create their home pages and other places quickly, without learning HTML. ("Places" are more than simply static text and graphics in an HTML page. They can use data from various databases, accessed by client or server applications). Generally, according to the present invention an object-oriented approach is preferred for example by using the programming language Java in combination with object-oriented data bases.

Users can control how much screen real estate to devote to the service provided by the present invention at any given moment. Depending on their degree of engagement with the system, the service can appear to members as an icon, a gadget, or a browser. If members are logged on but primarily interested in doing other work, the service will retire to a corner of the desktop as a modest icon indicating that they are logged in. In this mode, members may still receive notifications, if they choose. An intermediate degree of engagement presents the service as a "gadget"—a control center occupying minimal space on the desktop and allowing users to focus elsewhere while still maintaining immediate access to most functions. When users wish to immerse themselves in the system, the can open their favorite browser and other communication tools and integrate them with the service.

True to the central tenet of user control, the service offers members the ability to log onto the system and put out the equivalent of a "Do not disturb" sign., if they wish to accomplish something without being interrupted by messages. The "Do not disturb sign" can be limited on a group of identities of the user. Therefore the user can choose which messages he wants to receive even when they are addressed to another identity of the user than the log-in identity.

Users also have a database of personal information—contact information for friends and associates, lists of upcoming events they are interested in, pending e-mails, news, or any other information they want to keep. Processes in the system automatically create and maintain this database on the server, as a result of specific user action. Because it is kept on the server and not on the user's host computer, this database will be accessible from any compatible device.

The network according to the present invention is a large, complex, web-based system consisting of multiple databases and many collaborating, communicating processes. The databases hold a rich variety of heterogeneous data. For these reasons, an object-oriented approach is used: it allows rapid prototyping and produces code that is modular and relatively easy to enhance and extend. Also, object-oriented databases are particularly suited to holding heterogeneous data.

The system according to the present invention uses the Java programming language. Java is optimized for web-based development, being portable on both the server side (the computers executing system processes and running the databases) and the client side (the machine running the user's browser). It is also an object-oriented language and allows for rapid development, since (among other features) it does not require explicit memory management.

A user connecting to the system starts a client process that coordinates communications with the service and other users. The client process connects to a server using HTTP and communicates with a software entity called Session Manager by means of a persistent process, the Connection Manager.

The Session Manager allows a user to log into the system once, and then maintain his or her identity while performing any number of operations lasting an arbitrary amount of time. The Session Manager connects to a data base of members (including community organizers) and is responsible for knowing who is logged onto the system at any time, and whether they have posted the equivalent of a "Do not disturb" sign. It collaborates with another software entity, the Notification Server, which is responsible for transmitting the actionable messages (notifications) that users can send to each other. This collaboration allows the Notification Server to know who is online at any given time, and who is online but does not wish to be disturbed.

A Profile Manager maintains a database of user profiles—personal preferences and interests. As the member uses the system, various session-tracking processes watch in the background to capture relevant data (with the user's knowledge and consent). The data is then provided to the Profile Manager.

User profiles are stored in a manner ensuring security and anonymity. In accordance with the Open Profile Standard, the Profile Manager also ensures that profile information is sent only to those authorized to receive it, and that it is encrypted to ensure privacy.

An FYI Server is the process that periodically performs searches for information that the user has requested, based on explicitly provided search parameters and information in the user's profile. Its output is stored in the user's personal database.

A Directory Server enables searching. It maintains a database of all information on the system, in any form—

Web pages, user profiles, chat sessions, or any form of events sponsored by community organizers—any kind of data at all. The Directory Server collaborates with the Profile Manager to filter the results of searches and rank them in accordance with the searcher's interests and preferences. The Directory Server also allows members to connect to general World Wide Web search engines; it may also filter the results of those searches.

A Name Server is an essential part of the transmission infrastructure, keeping track of all the servers on the system in their various locations.

A typical hardware installation which can find application with the present invention is shown in FIG. 1. Each hardware installation represents a network domain.

Reference 1 generally designates a server 1 connected to user terminals (clients) 3 by means of a network (Internet) 2.

Each installation includes at least two process servers 8, 9 each connected to a database 10,11. The process servers 8, 9 are the computers that execute the many interacting software processes. A minimum of two are required for redundancy; if one server 8, 9 experiences a problem, the system can continue running and users experience no interruption in service. When a growing number of users 3 place increasing demands on the system, more servers can be added as necessary to increase system capacity.

The databases 10, 11 associated with the process servers 8, 9 hold the persistent data in the system: information about members, events, discussion groups, home and community web sites, and much else. They may reside on the same physical hard drive or different ones. They are object-oriented databases 10, 11.

Security

The databases 10, 11 can contain sensitive private information about members. Security will be implemented by isolating the process servers 8, 9 on a network having an IP address of the form 10.x.x.x. Routers 12 cannot connect directly to such a network. Instead, the network 2 is connected to a hub 15 connected to a bridge 14 which in turn connects to another hub 13. The hub 15 is on a network 2 to which routers 12 can connect.

The security bridge 14 protects the back-end process servers 8, 9 and databases 10, 11. A firewall could be placed between the hub 13 and the switch 14 to provide additional security for the back-end process servers 8, 9 and databases 10, 11 as well.

Clients and Front-end Processors

A user connects to the system using the control center (17 in FIG. 2)—the user's client process 3. The client process 3 connects from the Internet 2, through the router 12, to the external hub 15 and from there to a front-end processor 16: a computer 16 outside the security wall. The front-end processor 16 handles communication between the back-end server 8, 9 and the client 3 during authentication; a necessary step before the client process 3 can access.

The front-end processors 16 run so called daemons—background processes—for HTTP (Web access), NNTP 19 (news and discussion groups), IRC 20 (chat), and e-mail 21. They also run DNS (Domain Name Service) 22. Each front-end processor 16 may run all the required daemons. Alternatively the required daemons may be spread across several front-end processors 16.

After a user is authenticated following well known procedures, the front-end processors 16 connect the Connection Manager process to the Session Manager 23 through the bridge 14 to a process server 8, 9 and a database 10, 11.

The central installation also includes a terminal server 24 directly connected to every piece of hardware: computers, bridge 14 and router 12. An ISDN line connects this terminal server 24 to a remote location 25 where the operations manager can run tests, upgrade software, install patches, or reboot systems as necessary. The operation manager's dialup access is also secure; simply knowing the correct telephone number is not enough to gain access to the system through the maintenance channel 26.

Figure 2:
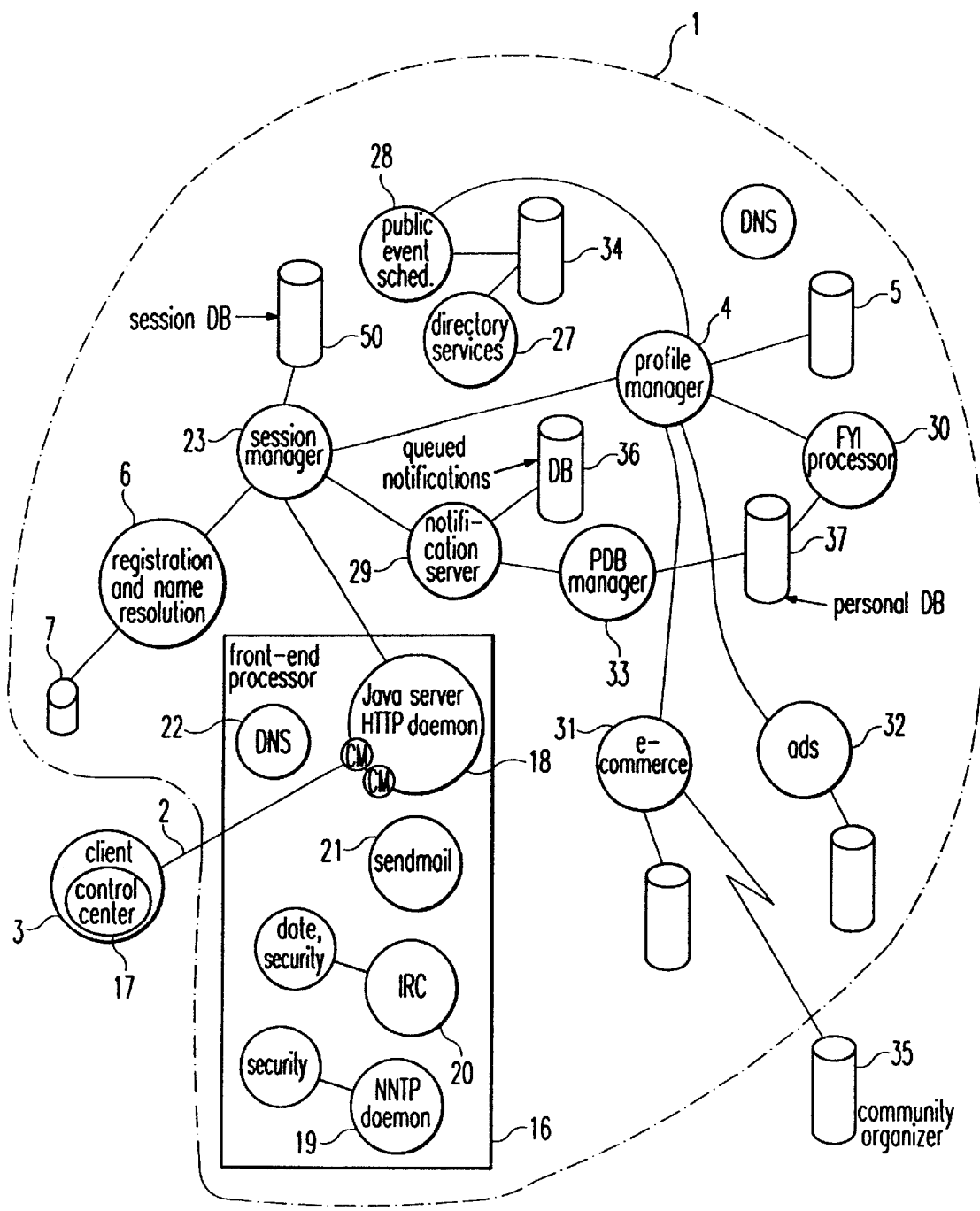
FIG. 2 shows in detail the activity distribution in the server and the user terminal of the network hardware structure shown in FIG. 1.

The processes of the hardware structure shown in FIG. 1 will now be explained with reference to FIG. 2.

The software constituting the processes can be written in Java using an object-oriented design. Most of the software runs on the process servers 8, 9, but also some software is written for the front-end processor 16.

Front-end Processors

When a client process 3 (the user's control center 17) connects to a front-end processor 16, that processor's HTTP daemon 18 spawns a new thread to manage the connection as it is known in object-oriented programming. These connection managers are terminated when the user severs the connection.

The IRC and NNTP daemons 19, 20 also include specialized processes to augment their capabilities. To allow for private chats and discussion groups, both daemons include security software that allows for access control. The IRC daemon 20 also transparently translates user names required by IRC (which have a nine-character limit).

Process Servers

The bulk of the processes runs on the back-end process servers 8, 9. In addition to DNS, the processes summarized in Table 1 collaborate to provide NCP's functionality. Each is discussed in greater detail below.

TABLE 1

NCP Processes

| Process | Purpose | Associated database? |
|---|---|---|
| Session Manager 23 | Tracks who is logged in (user and personality), and their current state: available, away, busy, or invisible. | session data base 50 |
| Name Resolution 6 | Correctly identifies user based on multiple identity, e.g. helps to route user notifications to the correct process server | Yes |
| Directory Services 27 | Used primarily for searching through the system. May also be used to schedule public events. | Yes |

TABLE 1-continued

NCP Processes

| Process | Purpose | Associated database? |
| --- | --- | --- |
| Public Event Scheduler 28 | May be integrated with Directory Services instead of separate process (unresolved issue). Schedules public events such as simulcast, celebrity chat. | Uses Directory Services Database. |
| Profile Manager 4 | Updates user's profile in response to specific user actions. Later releases may augment this with session-tracking. | Yes. Must be secure. |
| Notification Server 29 | Sends actionable messages (notifications) to members. | Yes, for queued notifications only. |
| FYI Processor 30 | Searches periodically for new info of interest, based on user's profile. | Uses Profile Manager database. |
| Personal Database Manager 33 | Manages a home page info, FYI info, queued notifications, pointer to user profile, application preferences, and "people I know" list. | Yes |
| E-commerce 31 | Supports online commercial transactions. | Yes. May also connect to CO's own database |
| Advertising 32 | Supports targeted advertising | Yes |

Session Management

The Session Manager 23 collaborates with the connection manager in the front-end processor 16 to enable users to log in and out. In addition, it returns a handle to a user's connection manager whenever a message arrives for that user: a notification, an e-mail message, or any other type of requested connection.

The Session Manager 23 also maintains session state: principally, the user's current "personality" and status. When logged in, users can be available, away, invisible or busy:

An available user can receive notifications from anyone.

Being invisible is a way to accomplish tasks without being bothered by others. While invisible, users can perform any system action they wish, but will not be visible to others' searches, nor will they receive other user's notification. (They may, however, receive notifications from community organizers.)

While away, users are visible to others. Being away is a means of letting others know that the user has stepped away from the computer for a brief period, perhaps for a cup of tea. If another user requests a chat or other real-time operation, the requester is informed that the requested user is away for a short period, and to try again later.

Being busy tells the others that the user is on the system but otherwise occupied, and doesn't wish to be disturbed. While busy, users are visible to others' searches but will not receive other users' notifications. (They may, however, receive notifications from community organizers.) Those wishing to contact can send e-mail or wait until the user becomes available.

The session manager 23 is connected to a session data base 50 which is also stored on the server 1 in an object-oriented approach.

Name Resolution

This process 6 runs only in the central server. It receives all requests to locate destinations (typically generated form notifications and e-mail), and is responsible for telling the requesting service which physical system the user is logged into, thus allowing the message to be routed to the correct server. It is the sole process with access to this information, thus helping to ensure user anonymity—users will not even be able to look at mail headers and tell which city someone lives in (or near).

Directory Services and Event Scheduling

This process 27, 28 can access a database 34 including all the searchable items, such as members, clubs, events, chat rooms, public or semi-private discussion groups, and home pages and other web sites. Searching it text-based, at least initially, using word-matching. Directory services 27 collaborates with the Profile Manager 4 to rank the results for relevance, based on the user's stated interests.

In addition, users can search for items belonging only to a particular category: for example, only discussion groups or only home pages or only people.

Event scheduling allows community organizers 35 to schedule events such as simulcasts, chats with public figures, or video conferences or other multimedia events at the most auspicious time. They can query the schedule to determine when possibly competing events are scheduled, and choose a time likely to be favorable.

Profile Manager

Each user 3 has at least one profile, which stores not only such commonplace information as name, address, nationality and preferred language, but also a variety of more sensitive information such as age, sex, marital status, income, occupation, education, religious preference, social class, lifestyle, and other demographic and psychographic data useful for marketing purposes.

It is imperative that adequate safeguards ensure that:
personal information is kept strictly confidential, and
data gathered for marketing purposes is kept strictly anonymous.

This is the primary reason for the physical and hardware security described above. No aspect of the software must be allowed to compromise this security.

Profiles can be used for a variety of purposes:
special event planning,
FYI data gathering,
targeted advertising
targeted promotions and loyalty programs.

When planning special events, community organizers 35 can find out how many members might be interested in the event, and can send e-mail and notifications only to those whose profiles indicate such potential interest. Although the community organizers 35 will have no knowledge of which specific individuals received their mail or notices, they will be assured that a certain number were sent, and that those who received them are more likely than most to have appreciated them.

The FYI process 30 uses member profiles to determine which data to gather on each member's behalf.

Notification Server

The notification server 29 is responsible for sending notifications—instant messages—between individuals, and between community organizers and individuals. To do so, the notification server 29 collaborates with the session manager 23 to determine who is currently online and available, and to get a handle to the recipient's connection manager in order to deliver the message. It then communicates with the notification server 29 on the recipient's server machine, if different, to deliver the notification.

Notifications are of two kinds: real-time and queued. Real-time notifications are typically from one individual member to another. When received, they are stored on the client's machine 3. If the intended recipient is off-line or invisible, they are not delivered. Queued notifications are sent by community organizers 35, typically to many members whom the community organizer believes will be interested. When they are created, the community organizer specifies a "time to live"—a period of time during which the notification remains relevant. If the intended recipient is off-line, they are queued in the notification server's 33 associated database 36 and delivered as soon as the recipient logs in, assuming that this occurs before the notification expires.

According to the present invention a plurality of addresses can be assigned to one user, as it is shown in FIG. 3. For example, possible addresses for the user George X. can be George@compu.xxx.com Superman@sport.xxx.com Max@game.xxx.com As can be seen from the above addresses, the user George X. can have different identities (George, Superman, Max) being respectively member of different groups (compu, sport, game, etc.). Each identity is easy to remember, and as there are different groups of users and one identity is only unique regarding one group, the numbers of interesting identities available for the users can be increased overall.

"xxx" represents the part of the URL designating the service or company name. Compu, sport or game represent both the group and the server (physical or virtual). The assignment information indicating which addresses are assigned to the same user is stored in a table 6 of the name resolution and registration process of the server 1. Thereby, preferably and object-oriented approach is used. Therefore the server 1 by checking the table 6 knows always which addresses belong to the same user.

It is assumed, that the user George X. has logged in by using the address "George@compu.xxx.com". In case the server 1 or another user 3 wants to forward an E-mail a message to the user George X. who has logged in with the address "George@compu.xxx.com", and addresses this notification to the address e.g. "Superman@sport.xxx.com", such a transmission will be prohibited according to the prior art. It will be prohibited, as the address "Superman@sport.xxx.com" at the moment is not available in the network, as George X. has not logged with said address.

According to the present invention, however, even in the case that George X. has logged in using the address "George@compu.xxx.com" an E-mail message sent for example to the address "Superman@sport.xxx.com" will caused to be sent to George X., as the server 1 will check the table 6 and determine, that the address "Superman@sport.xxx.com" does belong to the user George X., who is in a logged-in state, but with another address ("George@compu.xxx.com"). The notification could read: "Superman@sport.xxx.com" has new mail". The user George X. can decide whether he wants to connect as "Superman@sport.xxx.com" to access the new mail.

The user can associate the "Do no disturb sign" for a limited number of his identities. For example, when logged-in with the address "George@compu.xxx.com"), the user can select to not receive any message or notification addressed to his other address "Superman@sport.xxx.com". Therefore he will not be disturbed by other users seeking for sport orientated users when working professionally on his terminal.

Of course, the user can also choose that he is completely invisible for predefined identities among all identities assigned to him.

Respectively one profile containing characteristics of the preferences and/or interests of an associated address can be associated to one of the plurality of addresses assigned to the same user. The profiles can be stored in a database 5 of the profile manager 4. For example, in the case of FIG. 3, the user George X. will have a user profile associated with each of the plurality of addresses shown in FIG. 3. As each of the addresses represents a different identity of the user George X., the associated profiles will indicate different behaviors of George X. depending on the address used to log in by George X.

Other users will never know, which addresses are assigned actually to the same user person. Full secrecy is guaranteed as only the server knows the correlation of the different unique addresses with the users.

Furthermore respectively one home page can be created and associated to each of the plurality of addresses assigned to the same user. In the case of FIG. 3, for example, the user George X. can have a home page for the address "George.compu.xxx.com", another home page for the address "Superman.sport.xxx.com and one further home page for the address "Max.game.xxx.com".

As each of the addresses represent a certain different behavior of the user George.X., the different home pages will be created in a different way. The different home pages can also be stored in the server 1.

As has been shown with reference to FIG. 3, each address comprises a group name (compu, sport, game). These group names can be predefined and offered by the server 1. In the server 1 a group data base 7 is provided setting forth the different predefined groups offered to the users, the related preferences/interests and the users being members of the corresponding groups. Alternatively, users can create their own groups, define their related preferences/interests and access to the server 1 to add the new created group to the data base 7 in the server 1.

According to the present invention a so-called chat 39 proxy for IRC servers 40 is provided for name translation, additional security and additional services.

As it has already been set forth, the IRC protocol and the current IRC servers have some limitations regarding privacy and user names. The base nine character user nickname is inadequate. The IRC server has furthermore a very limited ability to maintain attributes and descriptive information about the channels. Therefore, according to the present invention a wrapper or proxy is provided between a chat client and the IRC server allowing the use of usual off-the-shelf IRC server software and at the same time to enhance the basic server used for the chat communications with additional features:

name translation from any address containing more than nine characters to nicknames with nine characters compatible with IRC, and translating back to identities with addresses of more than nine characters, the ability to supply the IRC channel with supplemental access control lists for members (read-write-participants) and non-members (read-only-participants) which represent the same semi-private chat room, the ability to supply the IRC client with supplemental descriptive information about the chat channel such as for example community organizers (sponsors), organizers/operators, moderators, and a descriptive paragraph about the chat (IRC supports only the name and channel).

Figure 5:
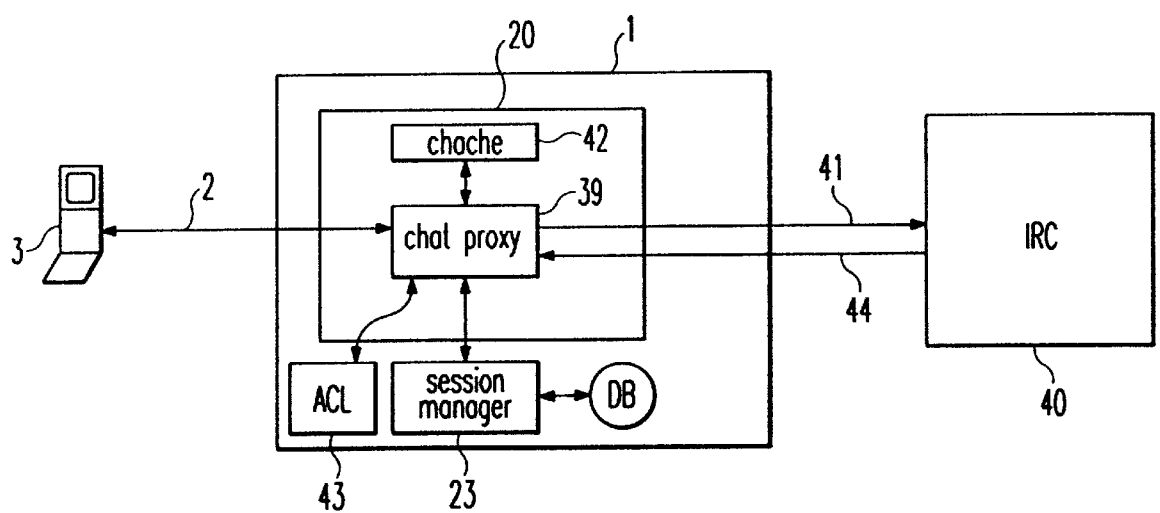
FIG. 5 shows in detail a structure according to an embodiment of the present invention.

The translation and additional information transmission procedure according to the present invention will now be explained with reference to FIG. 5. A chat client can send a command to the chat proxy 39, which represents a conversion means, together with the address of the sender (terminal 3 e.g.). The chat proxy 39 contacts the session manager 23 to get a unique nickname with nine characters for the user 3. The session manager 23 accesses the session data base 50. This nickname supplied from the session manager 23 to the chat proxy 39 is required to be unique only with the current on-line users, it does not need to be unique across time and space. Therefore, a nick can be reused after the user logs out. The nickname is a combination of a host code unique within the network and the sequence ID specific to host and guaranteed to be unique on the host. Both codes are alpha-numeric to provide maximum flexibility within nine characters. The chat proxy 39 then rewrites the IRC command with the nine character nickname and sends it to the IRC server 40 (reference 41). On the other hand, the IRC server 40 sends (reference 44) data to the client 20 (which is the reverse procedure of the incoming proxy), wherein the chat proxy (converting means) 39 effects the reverse translation. The chat proxy 39 can cache the translation to prevent performance problems with constant look-up in a storage device (cache) 42.

According to the present invention semi-private chat rooms (with an additional access control) can be provided. Therefore, a menu-driven interface is provided to add access control to private and semi-private chats. An access control data base 43 which is not part of the IRC server 40 is provided within a server 1. When a chat client 20 issues requests to join a chat in the standard IRC manner, an access control is first performed by the chat proxy 39 by accessing the ACL (access control data base) 43, and then upon successful access the name translation as stated above is performed.

Furthermore supplemental chat room attributes can be provided.

When a user creates a chat, the user is first authenticated whether he is an authorized member. Then the user is prompted to supply attributes that will further define the chat to be created, as for example description, categories (interest groups) and the type of chat (on-going, periodic, temporary, fixed one-time). These attributes are available from the chat proxy 39 by issuing a command, which allows the chat client the access to the directory service's data base without having to use a direct access protocol. The attributes of the chat may be changed using another command to the chat proxy 39 as well as via a direct access to the DS (directory services 27) data base.

Figure 6:
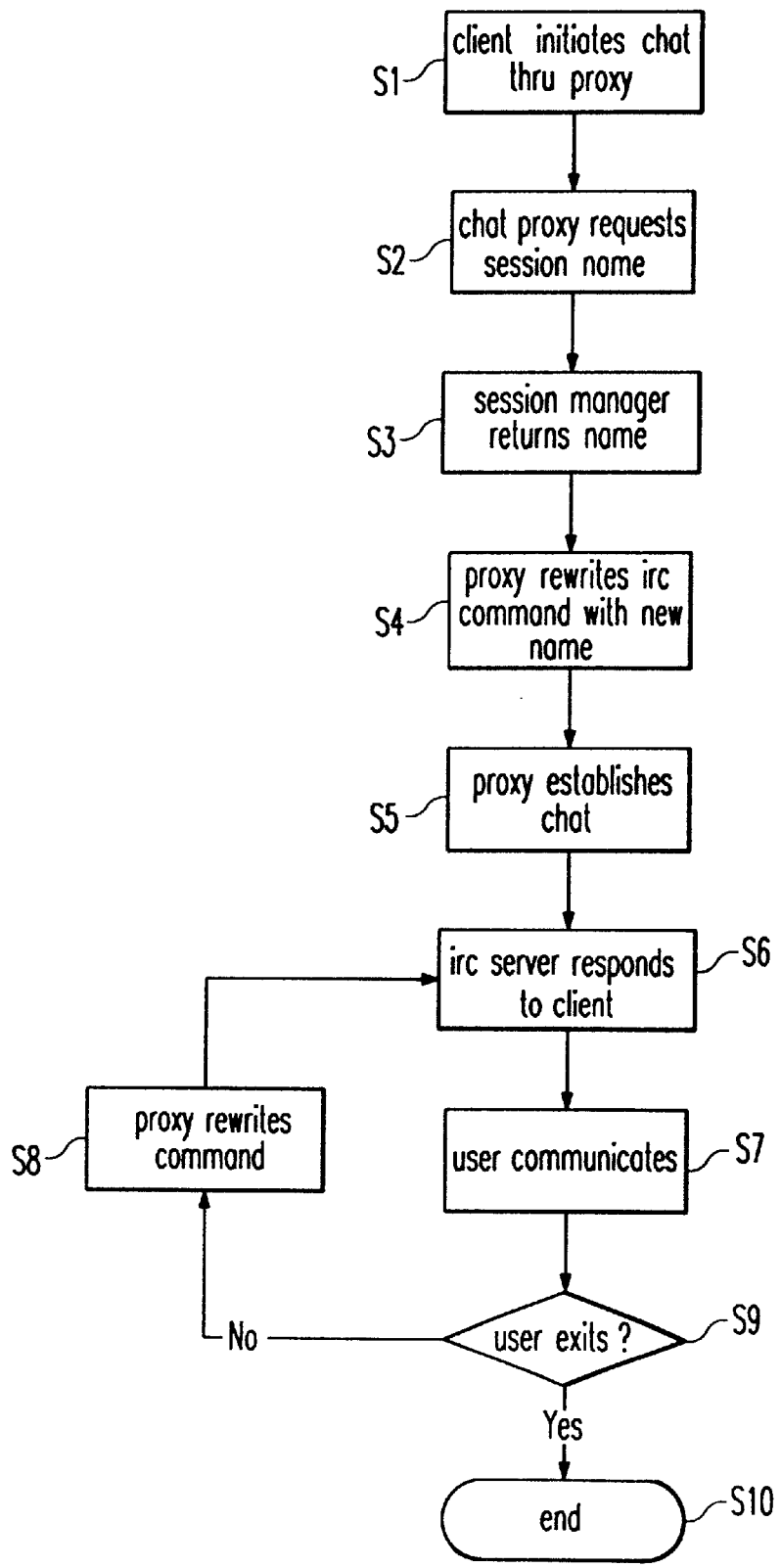
FIG. 6 shows a procedure executed according to an embodiment of the present invention.

With reference to FIG. 6 it will now be explained how a user can build up a communication with the IRC server 40. In a step S1 the client issues a command to initiate a chat through the chat proxy 39. The chat proxy 39 requests the session name of the session manager (step S2). The session manager returns the name (step S3). This name is limited to nine characters corresponding to the IRC protocol. In a step S4 the chat proxy 39, which represents the converting means, rewrites the IRC command with a new name. In a step S5 the chat proxy 39 establishes the chat with the IRC server 40. Then the IRC server 40 can respond to the client (step S6), and the user can communicate (step S7). Then it is checked whether the user exists in a step S9. In case the user does not exist, the chat proxy 39 rewrites the command (step S8) and the IRC server 40 again responds to the client. In case it is decided in step S9 that the user exists, the procedure is completed (step S10).

What is claimed is:

1. A method for a plurality of user terminals to communicate with each other in a network, comprising the steps of:
   a) transmitting a command with a sender address from said user terminal to converting means for converting said sender address into a code having up to nine characters;
   b) transmitting an internet relay chat command with said code to an internet relay chat server having at least one chat channel; and
   c) caching said code in storage means included in said converting means.

2. The method of claim 1, wherein said converting means contacts a session manager to obtain said code.

3. The method of claim 2, wherein said session manager is connected to a session database having the sender addresses of said user terminals, said database stored in an object-oriented approach on said server.

4. The method of claim 2, wherein said storage means cache said code when the session manager is contacted for the conversion of said sender address.

5. The method of claim 2, further comprising the step of said session manager accessing the internet relay chat server with access control means by checking access information stored in an access control database.

6. The method of claim 1, wherein information about said chat channel is supplied to said user terminal by said converting means.

7. A communication network for a plurality of user terminals to communicate with each other, comprising:
   a) an internet relay chat server;
   b) converting means for converting a sender address, received along with a command from said user terminal, into a code having up to nine characters; and
   c) storage means included in said converting means for caching said code.

8. The communication network of claim 7, further comprising a session manager connected to said converting means, wherein said converting means contacts said session manager to obtain said code.

9. The communication network of claim 8, wherein said session manager is further connected to a session database, said session database stored in an object-oriented approach on a server.

10. The communication network of claim 8, wherein said storage means cache said code when the session manager is contacted for the conversion of said sender address.

11. The communication network of claim 7, further comprising an access control database connected to said converting means, wherein said access control database controls access to said internet relay chat server based on information stored on said access control database.

* * * * *